United States Patent Office 3,555,000
Patented Jan. 12, 1971

3,555,000
PLASMINOGEN ACTIVATOR AND ISOLATION THEREOF FROM STROMATA OF HUMAN ERYTHROCYTES
Otto Wagner, Wuppertal-Elberfeld, Germany, assignor to Farbenfabriken Bayer Aktiengesellschaft, Leverkusen, Germany, a corporation of Germany
No Drawing. Filed Feb. 20, 1968, Ser. No. 706,787
Claims priority, application Germany, Mar. 2, 1967, F 51,690
Int. Cl. C07g 7/00, 7/026
U.S. Cl. 260—112                           3 Claims

ABSTRACT OF THE DISCLOSURE

A new plasminogen activator distinguishable from urokinase can be isolated from stromata of human erythrocytes at a pH of from about 1 to 4. The plasminogen activator is useful for the therapy and prophylaxis of thromboses and embolisms. The plasminogen activator is administered in the form of an injectable solution which can be prepared by techniques which are per se known in a therapeutic dosage of the same order of magnitude as urokinase. It has a molecular weight after processing in the ultracentrifuge between about 20,000 and 50,000. It is a protein, acid stable to pH 1 but is almost entirely destroyed at pH 9–10 at +4° C. for 5 hours. It is activated or catalyzed by small amounts fo urokinase which raises its activity 20–100 fold.

---

The present invention is concerned with a novel plasminogen activator, a method of isolating the same and an injectable solution thereof and its administration.

The plasminogen activator urokinase is known in the art. Urokinase is obtained from human urine and is enriched by adsorption and precipitation. The process for extracting urokinase is expensive because of the starting material used. Moreover, the content of the activator is so low that several one-thousand liter preparations must be worked up in order to obtain an amount sufficient to be useful as a therapeutic dosage.

It has now been found that a novel plasminogen activator can be obtained or isolated from the stromata of erythrocytes by extracting the stromata at a pH value of from 1 to about 4. The plasminogen activator may be further enriched by removing insoluble solids which are otherwise present. If desired, this may be followed by dialysis to separate low molecular substances which are also present as accompanying substances.

The activator itself is water soluble and is not dialyzable as upon membrane dialysis it is held back by the membrane such as Visking. The plasminogen activator may be conveniently isolated after extraction by lyophilization or precipitation both of which are techniques per se known.

According to the best mode of producing the plasminogen activator of the present invention, it is preferred to use stromata of human erythrocytes which are obtained as a by-product in the preparation of blood plasma or human blood which can no longer be used for blood transfusions. The extraction is conveniently carried out in the presence of inorganic or organic acids or other donators through which the pH can be adjusted and maintained at a range of from 1 to 4. The preferred pH is about 2. Aqueous hydrochloric acid is a particularly suitable acid which allows a pH of about 2 to be generated in an aqueous medium. The activator can be extracted into an organic phase from the aqueous acidic solution by extraction by phenols, such as phenol itself or chlorophenols. Accompanying undesirable proteins are separated during this step and remain either in the aqueous phase or are precipitated in a separated layer.

The extraction from the stromata and the transfer of the extract into the organic phase can also be carried out in one step by directly extracting the stromata from their aqueous acidic suspension with phenols which may be diluted with water immiscible organic solvents.

The activator is obtained from the phenolic phase by the use of an excess of a non-polar organic solvent and extracting by shaking with water. The aqueous solution of the activator can be further purified by dialysis which removes accompanying impurities. The usual purification techniques which are per se known, such as adsorption, chromatography, isoelectric precipitation and gel filtration can also be used for further purification.

The plasminogen activator is a protein, soluble in water, especially in acidic or alkaline reaction and is soluble in phenols. In an electrical field at pH 8 it migrates cationically. Urokinase is electrophoretically neutral at this pH and thus does not migrate. By membrane dialysis it is retained. The protein is not boilable but is acid stable to pH 1, while urokinase at this pH is rapidly destroyed; the plasminogen activator remains unchanged at pH 1 for 2 days at +4° C. At pH 9–10 at 4° C. in 5 hours it was almost entirely destroyed. The molecular weight of the plasminogen activator after processing in the ultracentrifuge lies betwen about 20,000 and 50,000. A very noteworthy property of the plasminogen activator is that by means of a small and even scarcely detectable amount of urokinase it is very strongly activated. When one incubates 1 CTA-unit of the new plasminogen activator with 0.01 CTA-unit of urokinase, the activity of the plasminogen activator rises 20–100 fold. The determination of the unit follows here as elsewhere in the application in the same way as in the case of urokinase, by measurement of the lysis zone of the Astrup-Müllertz plate.

The plasminogen activator is useful in the treatment and prophylaxis of thromboses and embolisms. It is administered in the form of an injectable solution until the condition for which it is used is cleared up. The technique of preparing the injectable solution is accomplished by methods which are per se known or hereinafter described using the purified plasminogen activator produced according to the present process. In the treatment and prophylaxis of thromboses and embolisms, the plasminogen activator is administered in the same dosage as urokinase, i.e. 1,000 to 200,000 or more CTA-units per person. It can be used alone or in admixture with other catalysts.

An injectable solution is made up by, for instance, dissolving the freeze-dried product (the lyophilizate) obtained according to Example 1 hereinafter in a 4 M urea solution so that 40–50 mg. are contained per 1 ml. of solution and the solution is then treated with carboxymethyl cellulose. The absorbate is washed several times with 0.005 M phosphate buffer of pH 7.34. The plasminogen activator is desorbed with 0.1 M phosphate buffer of pH 7.34, dialyzed, lyophilized and dissolved in physiological saline (NaCl) solution in a concentration of 1–4%, thus bringing about a 100-fold enrichment, approximately.

The invention is illustrated by the following non-limitative examples.

EXAMPLE 1

A suspension of about 30 g. of washed erythrocyte stromata in about 15 ml. of water is brought to pH 1.9 at room temperature with 1 N hydrochloric acid and stirred for 1 hour. The insoluble matter is removed by centrifuging, the supernatant part is dialyzed. The volume of the liquid is reduced to about 50 ml. by distillation in a vacuum. The dissolved substance is subsequently freeze-dried. On the fibrin plate according to Astrup-Müllertz, it exhibits a substantial plasminogen activation without a proteolytic activity of its own.

EXAMPLE 2

A suspension of about 30 g. of washed erythrocyte stromata in about 150 ml. of water is brought to pH 1.9 at room temperature with 1 N $H_2SO_4$ and stirred for 30 minutes. The aqueous phase is shaken with about 30 ml. phenol-chloroform (3:1), the aqueous phase is discarded. The phenolic phase is washed three times with approximately 100 ml. portions of water, the wash water is discarded. 700 ml. of a mixture of isopropyl ether chloroform (1:1) and about 150 ml. of water are subsequently added to the phenolic phase and the mixture is thoroughly shaken. Shaking is repeated with a further 150 ml. of water. The two aqueous extracts are combined, made up to about 100 ml., dialyzed as described and, finally, freeze-dried. The dry residue exhibits a strong plasminogen activation of the Astrup-Müllertz plate.

What is claimed is:

1. A process for isolating plasminogen activator which comprises extracting the activator from stromata of human erythrocytes at a pH of from about 1 to about 4 with an inorganic or organic acid, extracting the activator from the acidic solution with phenol, adding an excess of a non-polar organic solvent and extracting the activator from the phenolic phase with water.

2. A process according to claim 1 wherein the pH is about 2 and the inorganic or organic acid is aqueous hydrochloric acid.

3. A plasminogen activator of protein nature having a molecular weight upon ultra-centrifugation of 20,000 to 50,000; soluble in water and phenols, acid stable to pH 1 and unstable at pH 0–10; characterized by cationic migration in an electrical field at pH 8 and undialyzable by membrane dialysis; and obtained according to the process of claim 1.

References Cited

UNITED STATES PATENTS 2,460,550   2/1949   Strumia et al. _____ 260—112

WILLIAM H. SHORT, Primary Examiner

H. SCHAIN, Assistant Examiner

U.S. Cl. X.R.

424—101, 177